United States Patent
Dodson

(10) Patent No.: US 11,423,478 B2
(45) Date of Patent: Aug. 23, 2022

(54) METHOD AND APPARATUS FOR DETECTING ROGUE TRADING ACTIVITY

(71) Applicant: Elasticsearch B.V., Mountain View, CA (US)

(72) Inventor: Stephen Dodson, London (GB)

(73) Assignee: Elasticsearch B.V., Amsterdam (NL)

( * ) Notice: Subject to any disclaimer, the term of this patent is extended or adjusted under 35 U.S.C. 154(b) by 537 days.

(21) Appl. No.: 15/406,251

(22) Filed: Jan. 13, 2017

(65) Prior Publication Data

US 2017/0148096 A1    May 25, 2017

Related U.S. Application Data

(63) Continuation of application No. 14/180,723, filed on Feb. 14, 2014, now abandoned.

(51) Int. Cl.
*G06Q 40/04* (2012.01)

(52) U.S. Cl.
CPC .................................... *G06Q 40/04* (2013.01)

(58) Field of Classification Search
None
See application file for complete search history.

(56) References Cited

U.S. PATENT DOCUMENTS

| | | |
|---|---|---|
| 5,511,164 A | 4/1996 | Brunmeier et al. |
| 5,905,892 A | 5/1999 | Nielsen et al. |
| 6,012,152 A | 1/2000 | Douik et al. |
| 6,601,048 B1 | 7/2003 | Gavan et al. |
| 6,820,251 B1 | 11/2004 | Dwyer |
| 6,965,886 B2 | 11/2005 | Govrin et al. |
| 7,200,773 B2 | 4/2007 | Luick |
| 7,280,988 B2 | 10/2007 | Helsper et al. |
| 7,309,833 B2 | 12/2007 | Robeson et al. |
| 7,451,210 B2 | 11/2008 | Gupta et al. |
| 7,657,474 B1 * | 2/2010 | Dybala .................. G06Q 40/02 705/37 |
| 8,015,279 B2 | 9/2011 | Christodoulou et al. |
| 8,145,560 B2 | 3/2012 | Kulkarni et al. |

(Continued)

FOREIGN PATENT DOCUMENTS

| | | |
|---|---|---|
| AU | 5142098 A | 6/1998 |
| BR | 9713153 A | 2/2000 |

(Continued)

OTHER PUBLICATIONS

"Web Application Incident Responses & Forensics: A Whole New Ball Game" by Chuck Willis & Rohyt Bekani, a Black Hat briefing dated Feb. 28, 2007.*

(Continued)

*Primary Examiner* — Alexander G Kalinowski
*Assistant Examiner* — Blane A Lickteig
(74) *Attorney, Agent, or Firm* — Carr & Ferrell LLP

(57) ABSTRACT

A system and method for detecting fraudulent activity in the execution of transactions is disclosed. The system comprises a monitoring device for reviewing data relating to execution of transactions, a transaction profile and an alert module. The transaction profile includes a plurality of historic data items relating to typical transactions, which can be compared with current execution of transactions to generate an alert by the alert module if unusual activity is determined.

16 Claims, 4 Drawing Sheets

(56) References Cited

U.S. PATENT DOCUMENTS

| | | |
|---|---|---|
| 8,543,689 B2 | 9/2013 | Dodson |
| 2005/0080806 A1 | 4/2005 | Doganata et al. |
| 2006/0020924 A1 | 1/2006 | Lo et al. |
| 2006/0178856 A1 | 8/2006 | Roberts et al. |
| 2006/0190583 A1 | 8/2006 | Whalen |
| 2007/0245420 A1* | 10/2007 | Yong ................... H04L 63/1425 726/23 |
| 2007/0277152 A1 | 11/2007 | Srinivasan |
| 2009/0049335 A1 | 2/2009 | Khatri et al. |
| 2009/0177692 A1 | 7/2009 | Chagoly et al. |
| 2010/0121916 A1* | 5/2010 | Lin ....................... G06F 21/554 706/14 |
| 2010/0235915 A1* | 9/2010 | Memon ................ H04L 63/145 709/224 |
| 2011/0004580 A1* | 1/2011 | Varghese .............. G06N 20/00 709/224 |
| 2011/0145400 A1 | 6/2011 | Dodson |
| 2012/0216243 A1* | 8/2012 | Gill ........................ G06F 21/55 726/1 |
| 2012/0224057 A1* | 9/2012 | Gill ........................ G06F 21/55 348/143 |
| 2012/0296974 A1 | 11/2012 | Tabe |
| 2013/0305357 A1* | 11/2013 | Ayyagari ............. H04L 41/069 726/22 |
| 2014/0096249 A1* | 4/2014 | Dupont ................. G06F 21/00 726/23 |
| 2015/0235312 A1 | 8/2015 | Dodson |

FOREIGN PATENT DOCUMENTS

| | | |
|---|---|---|
| CA | 2272609 A1 | 6/1998 |
| EP | 2360590 A2 | 8/2011 |
| WO | 1998024222 A2 | 6/1998 |
| WO | WO-2013029968 A1 * | 3/2013 ......... H04L 63/1416 |

OTHER PUBLICATIONS

"Where Is Your Rogue Hiding", by James Heinzman published in Advanced Trading, Nov. 2011, pp. 30-31.*

Advanced Trading, Nov. 2011 by James Heinzman on pp. 30-31 (Year: 2011).*

Extended European Search Report dated Sep. 22, 2011 in Application No. EP10194379.3, 6 pages.

European Office Action dated Sep. 20, 2013 in Application No. 10194379.3, filed Aug. 24, 2011, 2 pages.

Summons to Attend Oral Proceedings dated Oct. 7, 2015 in Application No. 10194379.3, filed Aug. 24, 2011, 9 pages.

De Jongh et al., "A Review of Operational Risk in Banks and its Role in the Financial Crisis," SAJEMS NS 16, 2013, No. 4, pp. 364-382.

Culp, "Corporate Culture is Key Element in Fighting Rogue Trading," Forbes website, Jun. 21, 2012, 3 pages.

"Card Fraud," Nice Actimize, Fraud Prevention Solutions [online][retrieved on Jan. 3, 2014], retrieved from the Internet: www.niceactimize.com/index.aspx?page=solutionsfraudcard, 1 page.

"Rogue Trading," Nice Actimize, Fraud Prevention Solutions [online] [retrieved on Jan. 3, 2014], retrieved from the Internet: www.niceactimize.com/index.aspx?page=solutionsfraudtradingfraud, 1 page.

* cited by examiner

METHOD AND APPARATUS FOR DETECTING ROGUE TRADING ACTIVITY

CROSS-REFERENCE TO RELATED APPLICATIONS

The present application is a continuation of U.S. patent application Ser. No. 14/180,723, filed Feb. 14, 2014, which is hereby incorporated by reference in its entirety. The present application is also related to U.S. patent application Ser. No. 12/965,226, filed Dec. 10, 2010, and to U.K. Patent Application No. GB 1316319.1, filed Sep. 13, 2013, both of which are herein incorporated by reference in their entirety.

FIELD

This application relates to an apparatus, a method and a computer program product for detection of rogue trading.

BACKGROUND

A rogue trader is an individual who acts recklessly and independent of fellow employees to make unauthorized trades on behalf of their employer. The term is most often applicable to financial trading, in which professional traders make and approve financial transactions. Rogue traders typically trade in high-risk investments, which may cause considerable losses. These losses may be preceded by large, but unsustainable, profits. Financial institutions have, in the past, tended to largely ignore this potentially catastrophic form of operational risk, as described in the paper 'A Review of Operational Risk in Banks and its Role in the Financial Crisis', by De Jongh et al. and published in the SAJEMS NS 16 [2013] No. 4: 364-382.

An article on the Forbes website 'Corporate Culture is Key element in Fighting Rogue Trading', by Steve Culp, dated 21 Jun. 2012 notes that detection and prevention of rogue trading activity is not easy. Large financial institutions have made significant investments in sophisticated systems to identify unauthorized activities. The ability of individuals acting as rogue traders to avoid detection and to continue to make unauthorized trade remains a concern for risk management and executive teams in many leading organizations.

Current attempts at combatting rogue trading rely on rule-based systems in which transaction relating to trades are analyzed and, if the transactions trigger one or more of the rules, then the transaction is either not performed or an alert triggered. U.S. Pat. No. 6,965,886 [Goovrin et al., assigned to Actimize Limited Ltd, Petach Tikva, Israel] teaches such a system and method for collecting, filtering, analyzing, distributing and effectively utilizing highly relevant events in real time from huge quantities of data.

U.S. Pat. No. 8,145,560 [Kulkarni et al., assigned to FMR, Boston, Mass.] also teaches a rule-based system for detecting fraudulent activity on a network.

The known prior art methods for detection of fraudulent activity rely on a rule-based system. It is, however, established that rogue traders can circumvent the rules in the rule-based system if the traders understand how the rules operate. For example, a rogue trader may break down one trade into a number of smaller trades executed through different brokers in order to circumvent any rules restricting the size of a trade. Clearly it would be possible to construct a rule to avoid such circumvention once the issue has become known. There is, however, a need to develop a system, which can be used to identify potentially rogue trades at an earlier stage.

SUMMARY

A system and a method for detecting fraudulent activity are taught in this disclosure. The system comprises a monitoring device for reviewing any data relating to execution of transactions, such as trades, as well as an alert module for generating an alert on detection of irregularities in the transaction. The monitoring device is able to access a transaction profile, which includes a plurality of historic data items relating to typical transactions. The transaction profile is used to establish a profile base line for the execution of transactions, which are allowed by a financial institution's internal rules. The data items in the transaction profile could include but are not limited to sales transactions, put options, sale options, address lookup through a DNS server, network addresses, routing information, time, date and device cookies stored on a trader's computer. These data items taken alone may not indicate that an unauthorized transaction has taken place. However, the data items enable the transaction profile to be constructed for a trader carrying out authorized trades. Should any one of the traders in the financial institution deviate from the constructed transaction profile, then the pattern of trades can be investigated manually by, for example, a compliance officer in order to determine whether the trader is acting in accordance with the bank's accepted guidelines. The alert module generates an alert generally in real-time or at a later date on detection of irregularities or deviations from the transaction profile. The irregularities or deviation may not indicate directly that one of the traders is a rogue trader, but will allow the investigation by a financial institution's compliance department to ensure that no issue is raised.

In one aspect of the invention, the system may include a number of transaction profiles indicating different skills or responsibility levels of the traders. For example, a junior trader may only be able to undertake certain transactions and/or execute a certain level of transactions. A more experienced trader will be empowered to execute different types of transactions. It would be expected that the transaction profiles for the different skill levels of the traders will therefore be different. A group transaction profile can be established for a particular group of traders.

The method for detecting fraudulent activity involves the receipt from a first device such as a trader's computer, phone or tablet, and comparing the data items with a transaction profile. The alert will be generated and can then be passed to a supervisor for action.

DETAILED DESCRIPTION

The invention will now be described on the basis of the drawings. It will be understood that the embodiments and aspects of the invention described herein are only examples and do not limit the protective scope of the claims in any way. The invention is defined by the claims and their equivalents. It will be understood that features of one aspect or embodiment of the invention can be combined with a feature of a different aspect or aspects and/or embodiments of the invention.

Figure 1:
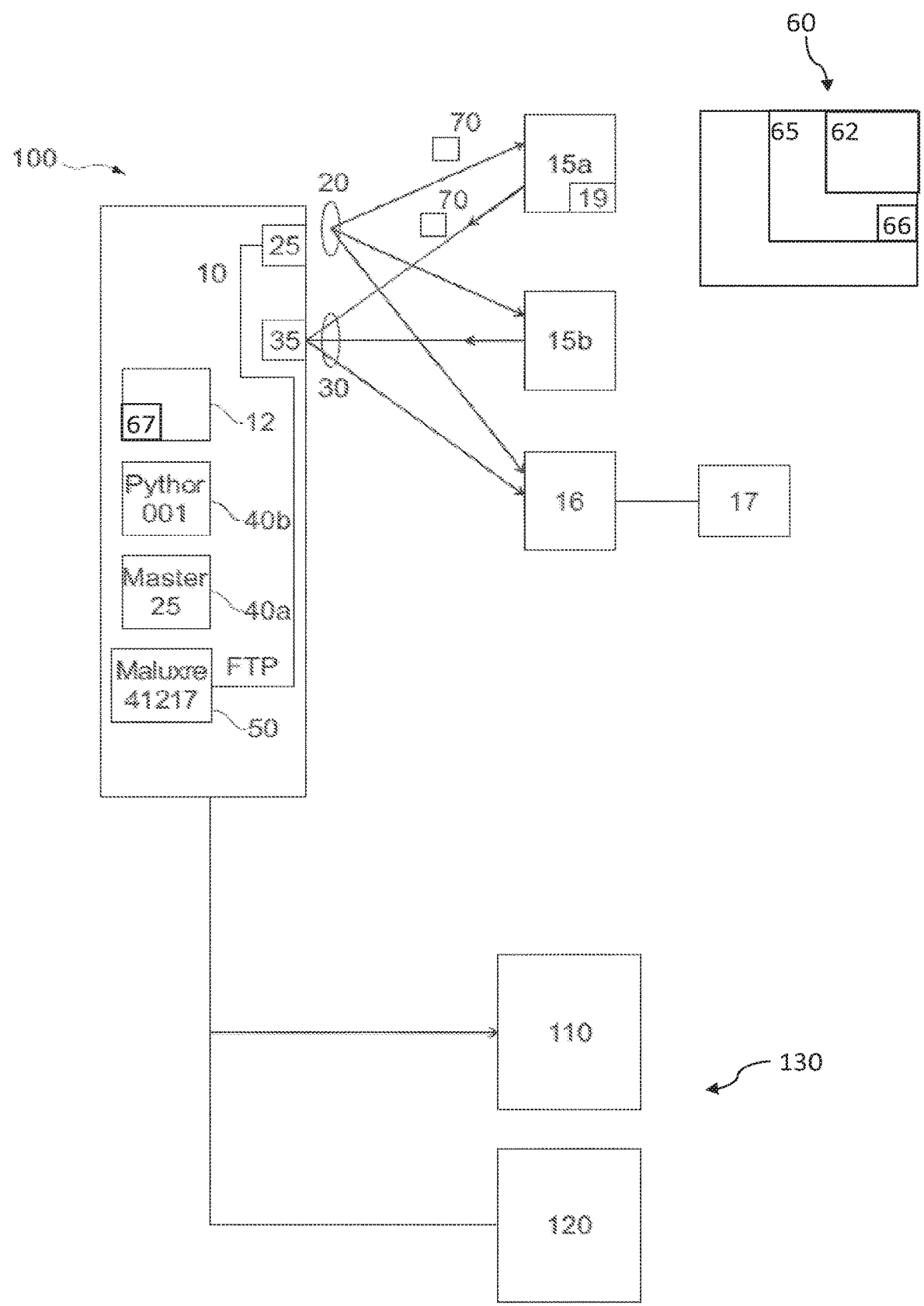
FIG. 1 shows an overview of a user computer connected to a network.

FIG. 1 shows a system 100 for detecting fraudulent activity according to one aspect of the invention. The system includes a user computer 10 with a plurality of outgoing connections 20 and a plurality of incoming connections 30. The user computer 10 could alternatively be a smartphone or tablet as well as a desktop or laptop computer and the term is intended to cover these alternates. The outgoing connections 20 and the incoming connections 30 are connected to one or more transactional servers 15a or 15b. The transmission of data over the outgoing connections 20 and the incoming connections 30 in the system 100 is carried out using, for example, packet-based networks or circuit-based networks. Packet-based networks include, but are not limited to, the Internet, a private internet protocol (IP) network, or a wireless network (such as GPRS, UMTS or LTE). Circuit-based networks include, but are not limited to, the public switched telephone network (PSTN), a wireless network (such as RAN Bluetooth, CDMA, TDMA or GSM).

A user at the user computer 10 is a stock trader, who is engaged in the buying and selling of financial products, such as bonds, stocks, futures, derivatives and shares, in for example the stock exchange (bourse) or commodity markets. The trader interacts with the user computer 10 to retrieve information about financial products from information sources, such as Reuters or Bloomberg through a webserver 16 linked to the Internet 17 or an intranet, and to execute trades in the financial products. The trades include buy and sell orders. The buy and sell orders can be carried out using a program running on a transactional server 15, using a browser program on the user computer 10 or by using a dedicated trading application program running on the user computer 10. The user computer 10 can include a verification device 12 for verifying the identity of the trader wishing to execute the trade, and the authenticity of the trade. Suitable verification devices 12 include, but are not limited to, card readers, one-time key devices, a password entry device or a combination thereof. The verification device 12 includes an alert module 67 for generating an alert in the event that the trade is not authorized. Messages 70 are passed between the user computer 10 and the transaction servers 15a-b to instruct the transaction servers 15a-b to execute the trades.

The transactional server 15a can also include an authorization device 19, which reviews the transaction before execution for compliance with the financial institution's compliance rules. The authorization device 19 is, for example, a rules-based device, as known in the art. The authorization device 19 is shown only in the transactional server 15a. The authorization device 19 could be on all of the transactional servers 15a-b or on a single transactional server 15a, but accessed by other ones of the transactional servers such as transaction server 15b.

A monitoring device 60 installed within the system 100 in which the user computer 10 and the transactional servers 15 are operating. The monitoring device 60 continually monitors the system 100 and the user computer 10 as well as the messages 70 exchanged within the system 100 and/or generated by the user computer 10 and/or generated by the transactional server 15b. The monitoring device 60 uses a variety of data and data sources for performing the monitoring.

Examples of the data collected by the monitoring device 60 include data items 66 relating to the websites accessed by the trader. These data items include but are not limited to global address lookup (i.e., global IP address used by ICAAN), network address, routing information, time, date, device cookies downloaded or used, device fingerprints as well as volume and timing of trades and combinations thereof. The monitoring device 60 can also use data sources based on network flow traffic statistics through the system 100 and to the outside network. These data sources include proxy logs and NetFlow records, which record the destination of data sent through outgoing ports 25 of the user computer 10 and/or the transactional server 15 as well as the source of incoming data received through the incoming ports 35 at the user computer 10 and/or the transactional server 15.

Many computer networks 130 also have a DNS server 110 located in a private network, as well as having access to public DNS servers 120. The DNS server 110 includes a variety of data log entries, including time stamps, indicating which ones of the trader computers attempted to access which web sites or external servers at which period of time.

The monitoring device 60 can also review headers in emails and/or other messages 70 sent throughout the computer network 130. The email headers will include information, such as the time, the destination and the source, as well as having information about the size of the email.

It will be appreciated that these data sources are merely exemplary and that other data sources can be used or supplied. Only a single user computer 10 is shown in FIG. 1 for simplicity. In practice, there will be a large number of user computers 10 and transactional servers 15. It will be appreciated that the system 100 may also contain other devices that can generate messages 70 or other data.

The monitoring device 60 creates a transaction profile 62 for the traders/users and/or the user computer 10 based on behavior of the user or a group of users. The transaction profile 62 is stored in a user profile database 65 attached to the monitoring device 60. It will be appreciated that the user profile database 65 contains more than one transaction profile 62 and that each one of the traders (and possibly the user computers 10) can have a separate transaction profile 62 and/or a group transaction profile 62 can be created for a group of traders. The transaction profile 62 in the user profile database 65 receives the data items 66 that indicate how the user computer 10 generally reacts with the system 100 as well as with the transactional servers 15 and other devices in the system 100 such as the web server 16 or the DNS server 110. The user profile database 65 will continually be updated as new ones of the data items 66 relating to activity of the user computer 10 are generated. The transaction profile 62 creates in essence a baseline from which a 'normal' behavior of the trader and/or the user computer 10 can be deduced.

The transaction profile 62 will be built up from the trader's typical interactions. For example, a trader will typically make trades at a particular rate, volume and price. The traders will also potentially typically trade in particular markets or stocks and exhibit periodic and seasonal variances. The transaction profile 62 is therefore a statistical model of the trader based on these trades. The transaction profile 62 represents the probability of a specific interaction based on historical behavior and is thus a baseline against which rogue trading activities can be detected.

The transaction profile 62 for a group of traders can be built up to represent the baseline for a particular trading activity. One example would be a group of commodity traders. The user profile database 65 could have both the individual transaction profile 62 for an individual one of the traders and a further group transaction profile for the group of commodity traders.

Suppose now that a trader (or a person using the user computer 10) initiates the rogue trading activities. The monitoring device 60 will receive further data items 66 relating to the rogue behavior. The further data items 66 indicate that behavior of the user computer 10 deviates from the normal baseline behaviour expected by comparison with the transaction profile 62 stored in the user profile database 65. Non limiting examples of such deviant behaviour include massive amounts of data being transferred to one of the transaction servers 15, unusual patterns of orders or access to a rarely used website or automated execution of trades. The monitoring device 60 can notify in real time an administrator of a possible fraudulent activity initiated by the user computer 10 and the administrator or compliance department can investigate the activities from the user computer 10.

Figure 2:
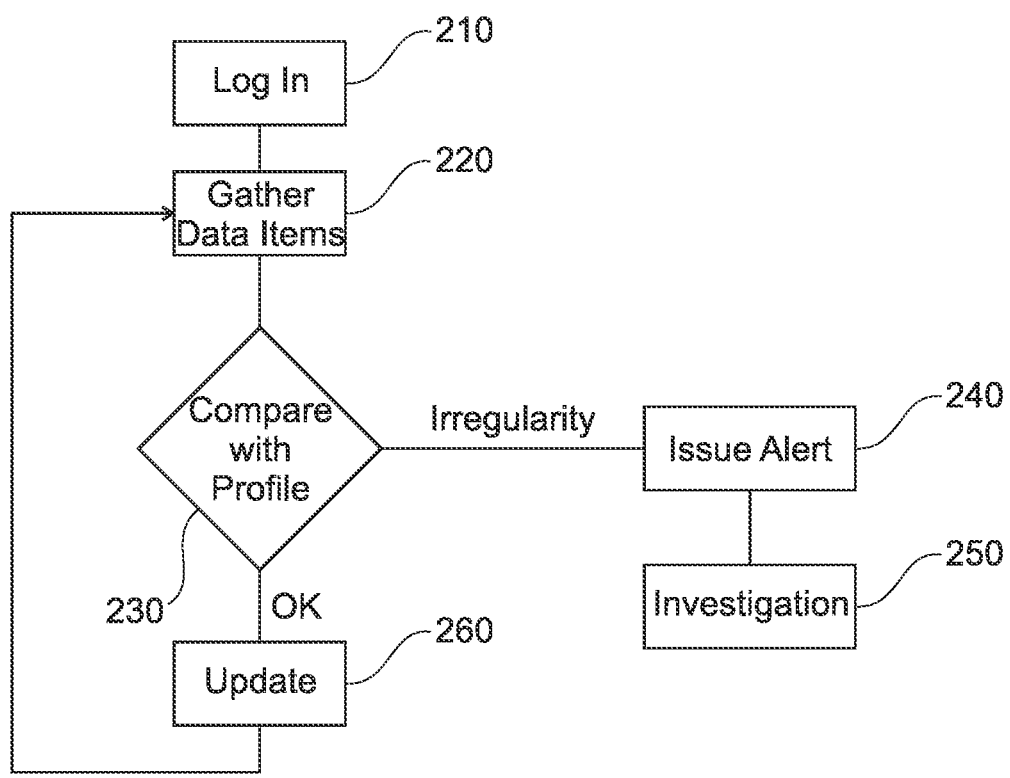
FIG. 2 shows a flow diagram of the method.

FIG. 2 shows an outline of a process for the detection of fraudulent activity by the rogue trader. The process starts at step 210 by a log in of the trader at the user computer 10 and in step 220 the data items 66 from the various data sources are gathered. In step 230 the gathered data items 66 are compared with one or more of the transaction profiles 62. There may be more than one transaction profile 62 and, in this case, the transaction profile 62 most representative of the trader at the user computer 10 is chosen. If an anomaly or irregularity is discovered, an alert is generated in step 240 such that the administrator or the compliance officer can investigate in step 250. In step 260, the transaction profile 62 is updated from the newly gathered data items 66.

The updating of the transaction profile 62 in step 260 ensures that the transaction profile 62 is continually adapted to new types of orders or data sources or other transactional servers 15 inserted into the system 100.

In a further aspect of the invention, the system and method can be used to detect further types of fraudulent behaviour using the user computer 10 or in the system 100. It would be possible, for example, to use the teachings of a disclosure to detect other types of fraud by users of the user computer 10. The fraud can be detected by, for example, identifying anomalous attempts to access certain websites, which are not normally accessed, or, by an attempt to transfer significant amounts of data to a computer or memory device that is not normally in use, or by the generation of a large number of emails in a particular period of time.

The detection of fraud is made by detection of unusual activity in the transaction profile 62. One further method for identifying fraud is by comparing the different ones of the transaction profiles 62 of different users of the computer 10. If one of the transaction profiles 62 is substantially different than other ones of the transaction profiles 62, then notification can be made to an administrator or a compliance officer to investigate activities of the trader and the user computer 10. Another method for identifying fraud is if the transaction profile 62 suddenly changes or is unexpectedly modified. Similarly if the activity at the user computer 10 does not reflect the transaction profile for the expected group transaction profile 62, then the notification can also be issued.

The transaction profile 62 can be initially created by using a set of training data obtained from analysing over a period of time. The training data will represent real-life, non-rogue situations.

In a further aspect of the invention, a malware 50 may he operating on the user's computer 10. The malware 50 could be a specially developed piece of software code or could be a regular piece of code and will generally also run as a process. The malware 50 is also connected to one or more of the outgoing ports 25 or the incoming ports 35. In the aspect of the invention shown in FIG. 1, it is assumed. that the malware 50 is a process in the user computer 10 running a file transfer protocol using the outgoing port 41217. The malware could also be a modified version of an existing piece of code.

A monitoring program 60 installed within the network 100 in which the user computer 10 is operating continually monitors the network 100 and the user computer 10 as well as messages 70 exchanged within the network 100 and/or generated by the user computer 10. The monitoring program 60 uses a variety of data sources for performing the monitoring.

The monitoring program 60 uses data sources based on network flow traffic statistics through the computer network 100, These data sources include proxy logs and Netflow records, which record the destination of data sent through the outgoing ports 25 and the source of incoming data received through the incoming ports 35. The monitoring program 60 analyzes headers in the data records and can also investigate which browsers are being run on the user computer 10.

Many computer networks 100 also have a DNS server 110 located in the private network, as well as having access to public DNS servers. The DNS server 110 includes a variety of data log entries, including time stamps, indicating which ones of the user computers attempted to access which web sites or external servers at which period of time.

The monitoring program 60 can also review headers in emails and/or other messages 70 sent throughout the computer network 100. The email headers will include information, such. as the time, the destination and the source. as well as having information about the size of the email.

The monitoring program 60 creates a user profile 62, stored in a user profile database 65 attached to the monitoring program 60, for each one of the user computers 10 using the plurality of data sources. It will be appreciated, that the user profile database 65 contains more than one user profile 62. The user profile 62 in the user profile database 65 receives data items 66, that indicate how the user computer 10 generally reacts with the network 100 as well as with servers 15a-b and other devices in the network 100. For example, the user profile 62 identifies which ones of the outgoing ports 25 and the incoming ports 35 are typically used by the user computer 10 for which processes. The user profile 62 will continually be updated as new ones of the data items 66 relating to activity of the user computer 10 are generated. The user profile 62 creates in essence a baseline from which the 'normal' can be deduced.

Suppose now that the malware process 50 starts on the user computer 10. The monitoring program 60 will receive further data items that indicate that behavior of the user computer 10 deviates from the behavior expected by comparison to the user profile 62 stored in the user profile database 65. Non limiting examples of such deviant behavior include massive amounts of data being transferred to one of the servers 15a-b, or continual access to a new website. The monitoring program 60 can notify an administrator of a possible malware infection of the user computer and the administrator can investigate the user computer 10.

Figure 3:
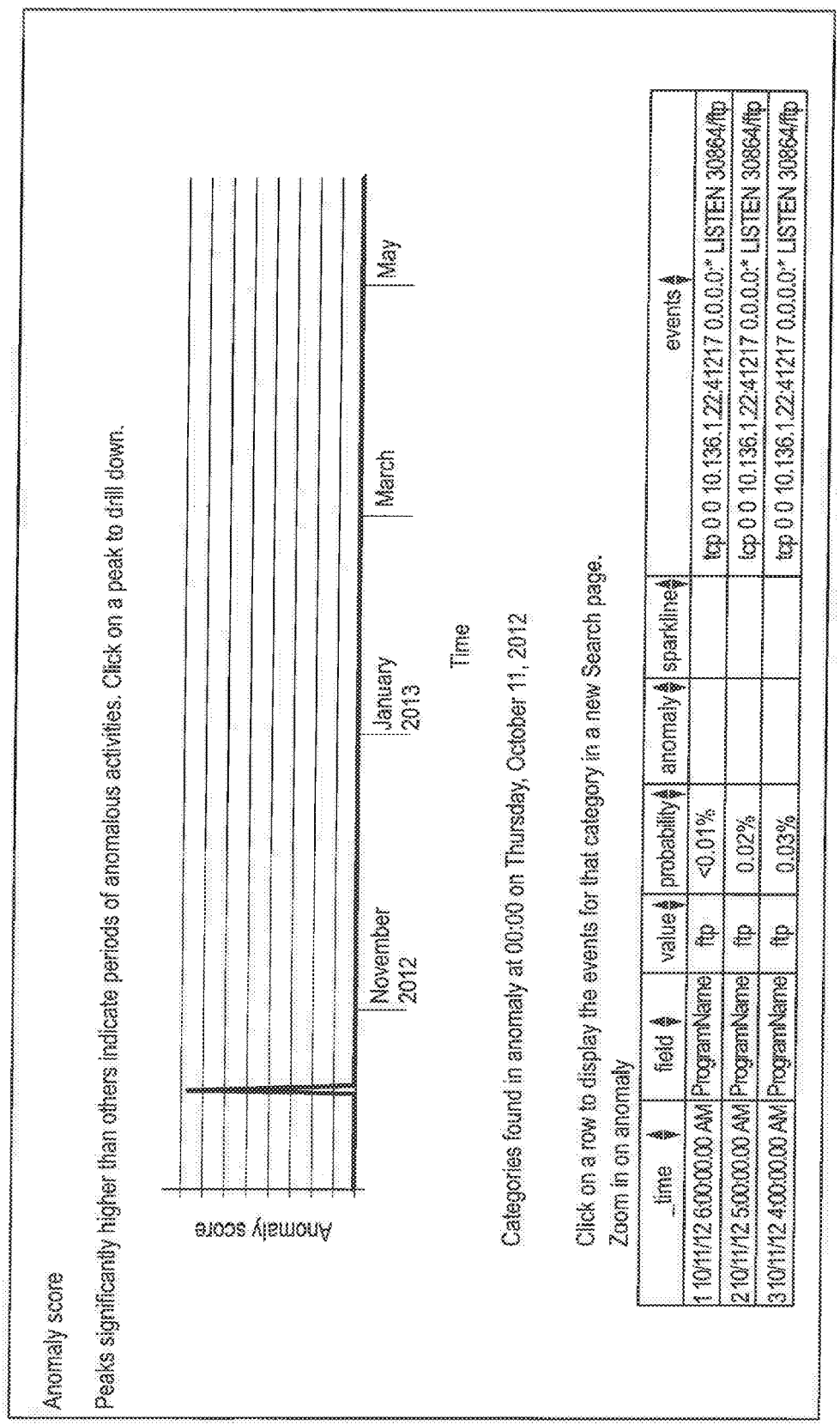

An example is shown in FIG. 3. FIG. 3 shows how the monitoring system reports anomalous behavior. On Thursday October 2012 an ftp process started on a server 15a-b. This process was unusual compared to the normal network processes 40a-b running on this server. The monitoring program 60 automatically identified this and reported this as a non-zero anomaly score.

Figure 4:
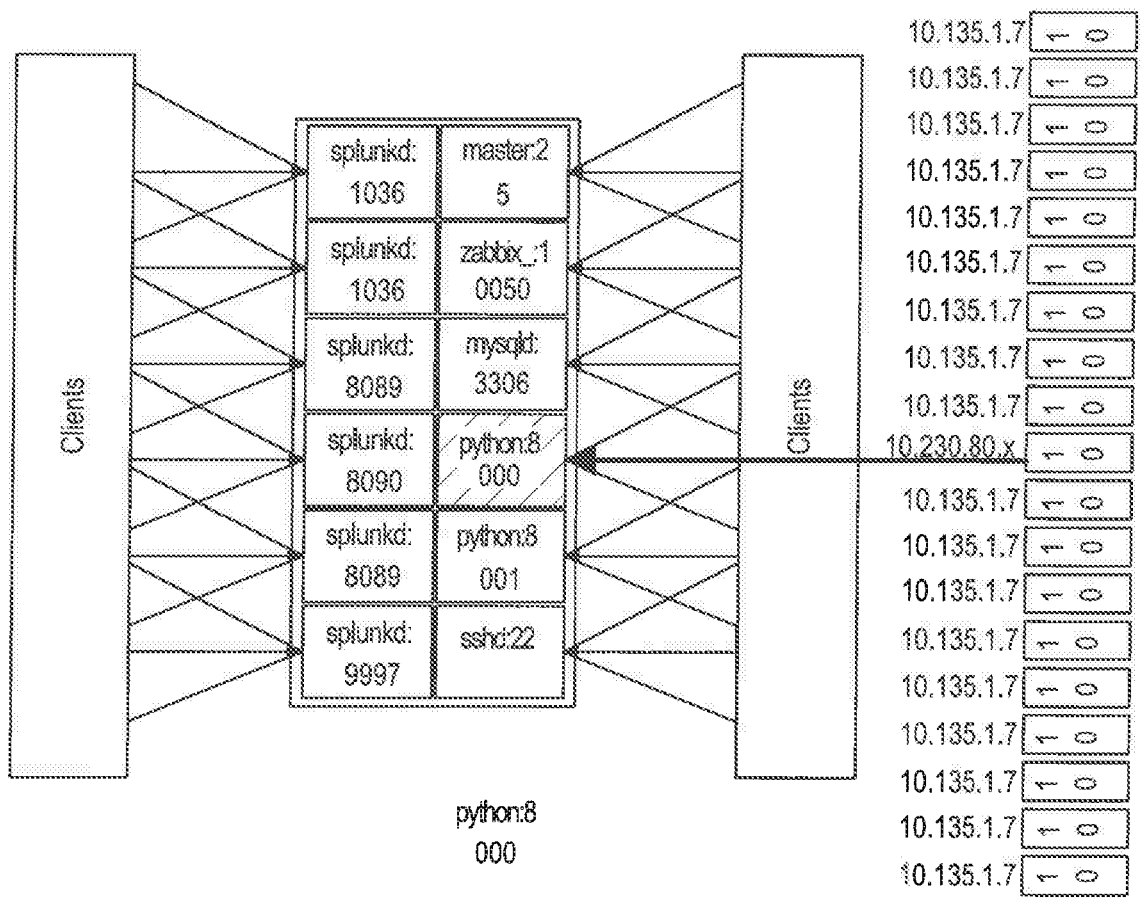

Another example is shown in FIG. 4. in which two user computers 10 connected to a server 15 running a plurality of processes. One of the processes connects generally to the same IP address 10.135.1.7. However, in one instance this connects to an IP address 10.230.80.46 (shown in FIG. 4 as 10.230.80.x), which is unexpected. This unexpected connection will be picked up by the monitoring program 60 and reported to the administrator.

The monitoring program 60 can also review attempts to connect to the user computer through various ones of the incoming ports 35. For example, incoming requests for a particular process would be expected on several of the incoming ports 25. An attempt to connect to a particular process would he detected by the monitoring program 60 and indicated to the administrator. The monitoring program 60 would identify that a connection to a particular process through a particular port 25 has never or rarely been seen is a deviant behavior and generate an alert 80 for the administrator.

FIG. 2 shows an outline of a process for the detection of irregularities, such as malware. The process starts at 210 and in step 220 data from the various data sources is gathered. In step 230 the gathered data is compared with one or more of the user profiles 62 and, if an anomaly is discovered, an alert is generated in step 240 such that the administrator can investigate in step 250. In step 260. the user profile 62 is updated from the newly gathered data items, The user profile 62 will also be updated using data relating to the anomaly.

REFERENCE NUMERALS

10 User Computer
12 Verification Device
15 Transactional Servers
16 Web server
17 Internet
19 Authorization Device
20 Outgoing Connections
25 Outgoing port
30 Incoming Connections
35 Incoming port
60 Monitoring Device
62 Transaction Profile
65 User profile database
66 Data Items
67 Alert module
70 Message
100 System
110 Private DNS Server
120 Public DNS Server
130 Computer Network

What is claimed is:

1. A system for detecting malware and fraudulent activity of at least one user, the system comprising:

a plurality of transactional devices in communication with a plurality of transactional servers, wherein the plurality of transactional devices are configured to execute transactions using the plurality of transactional servers, the plurality of transactional devices including a plurality of computing devices, wherein each of the plurality of computing devices is used by one or more of a plurality of users for executing the transactions, wherein each of the plurality of users is assigned one of responsibility levels, each of the responsibility levels defining a type of the transactions each of the plurality of users is allowed to execute;

a plurality of verification devices, each of the plurality of verification devices being connected to one of the plurality of transactional devices and including one of the following: a card reader, a one-time key device, and a password entry device;

a data processing apparatus comprising at least a monitoring device, an alert module, and a database, wherein:

the monitoring device is in communication with the plurality of transactional devices and the plurality of transactional servers and programmed to:

gather a plurality of data items at a time of generation accruing from historical behavior of the plurality of users in association with the plurality of transactional devices, wherein for each device of the plurality of transactional devices, the plurality of data items include a domain name system (DNS) server data log entry and at least one item from a group consisting of at least one data transfer volume, at least one accessed website address, at least one IP address, and at least one port address;

gather a further plurality of data items at the time of generation accruing from data generated by the plurality of transactional servers in response to communications received from the plurality of users via the plurality of transactional devices, wherein for each device of the plurality of transactional devices, the further plurality of data items include a domain name system (DNS) server data log entry and at least one item from the group consisting of at least one data transfer volume, at least one accessed website address, at least one IP address, and at least one port address;

verify an identity of each of the plurality of users using one of the plurality of verification devices;

analyze the plurality of data items and the further plurality of data items for a period of time;

based on the analysis, train a statistical model for the period of time;

create a baseline transaction profile for each of the plurality of users executing the transactions on the plurality of transactional devices based on a training set, the training set being created based on the statistical model and training data, the training data being selected from:

the plurality of data items accruing from the historical behavior of each of the plurality of users, the plurality of data items at least comprising a domain name system (DNS) server data log entry, and at least one item from the group consisting of at least one data transfer volume, at least one accessed website address, at least one IP address, and at least one port address, the historical behavior indicative of a normal operation of each of the plurality of computing devices; and the further plurality of data items accruing from the data generated by the plurality of transactional servers in response to the communications received from each of the plurality of users;

group the plurality of users into groups based on the one of responsibility levels of each of the plurality of users;

create a group baseline transaction profile for each of the groups based on the training set created, the statistical model, and the plurality of data items accruing from the historical behavior of one or more of the plurality of users of each of the groups;

receive, from the plurality of transactional devices, further data items relating to present behavior of the plurality of users and a type of transactions executed by the plurality of users, wherein the further data items comprise a domain name system (DNS) server data log entry and at least one item from the group consisting of at least one data transfer volume, at least one accessed website address, at least one IP address, and at least one port address;

compare the further data items relating to the present behavior of at least one of the plurality of users to the baseline transaction profile of the at least one of the plurality of users;

compare the type of transactions executed by the at least one of the plurality of users to the group baseline transaction profile of one of the groups into which the at least one of the plurality of users is grouped;

based on the comparison, detect irregularities between the present behavior and the type of transactions executed by the at least one of the plurality of users and at least one of the baseline transaction profiles of the at least one of the plurality of users and the group baseline transaction profile of the one of the groups, the detecting of irregularities including detecting an automated execution of a transaction, and detecting a deviation from the normal operation of each of the plurality of computing devices, the deviation including a deviation in data transfer volume, a continued access to a website address or IP address not in the baseline transaction profile, or a deviation of a port address; and update the baseline transaction profile of each of the plurality of users and the group baseline transaction profile of each of the groups to include the further data items accruing from the present behavior of each of the plurality of users; and the alert module is in communication with the monitoring device, the alert module being programmed to generate an alert, in real time, based on the detection of the irregularities, the irregularities from the normal operation comprising a deviation in data transfer volume, a continued access to a website address or IP address not in the baseline transaction profile, or a deviation of a port address, the irregularities potentially being indicative of malware.

2. The system of claim 1, wherein the plurality of data items comprise at least one of: security purchase transaction data, security sale transaction data, put options pricing data, global address lookup, network address, routing information, transaction time stamp, transaction date stamp, and device cookies data.

3. The system of claim 1, wherein the responsibility levels of the plurality of users are retrieved from a plurality of transaction profiles of the plurality of users.

4. The system of claim 1, wherein the historical behavior comprises data items selected from at least one of a rate, volume, price, stock ticker, periodic variances in volume rates, and seasonal variances in rates or volumes.

5. A method for detecting malware and fraudulent activity of at least one user, the method comprising:

gathering, by a monitoring device of a data processing apparatus, a plurality of data items at a time of generation accruing from historical behavior of a plurality of users in association with a plurality of transactional devices, wherein for each device of the plurality of transactional devices, the plurality of data items include a domain name system (DNS) server data log entry and at least one item from a group consisting of at least one data transfer volume, at least one accessed website address, at least one IP address, and at least one port address, the plurality of transactional devices including a plurality of computing devices, wherein each of the plurality of computing devices is used by one or more of the plurality of users for executing transactions, and wherein each of the plurality of users is assigned one of responsibility levels, each of the responsibility levels defining a type of the transactions each of the plurality of users is allowed to execute;

gathering, by the monitoring device, a further plurality of data items at the time of generation accruing from data generated by a plurality of transactional servers in response to communications received from the plurality of users via the plurality of transactional devices, wherein for each device of the plurality of transactional devices, the further plurality of data items include a domain name system (DNS) server data log entry and at least one item from the group consisting of at least one data transfer volume, at least one accessed website address, at least one IP address, and at least one port address;

verifying, by the monitoring device, an identity of each of the plurality of users using one of a plurality of verification devices, each of the plurality of verification devices being connected to one of the plurality of transactional devices and including one of the following: a card reader, a one-time key device, and a password entry device;

analyzing, by the monitoring device, the plurality of data items and the further plurality of data items for a period of time;

based on the analysis, training, by the monitoring device, a statistical model for the period of time;

creating, by the monitoring device, a baseline transaction profile for each of the plurality of users executing the transactions on the plurality of transactional devices based on a training set, the training set being created based on the statistical model and training data, the training data being selected from:

the plurality of data items accruing from the historical behavior of each of the plurality of users, the plurality of data items at least comprising a domain name system (DNS) server data log entry, and at least one item from the group consisting of at least one data transfer volume, at least one accessed website address, at least one IP address, and at least one port address, the historical behavior indicative of a normal operation of each of the plurality of computing devices; and the further plurality of data items accruing from the data generated by the plurality of transactional servers in response to the communications received from each of the plurality of users;

grouping, by the monitoring device, the plurality of users into groups based on the one of responsibility levels of each of the plurality of users;

creating, by the monitoring device, a group baseline transaction profile for each of the groups based on the training set created, the statistical model, and the plurality of data items accruing from the historical behavior of one or more of the plurality of users of each of the groups;

receiving, by the monitoring device, from the plurality of transactional devices, further data items relating to present behavior of the plurality of users and a type of transactions executed by the plurality of users, the further data items comprising a domain name system (DNS) server data log entry and at least one item from the group consisting of at least one data transfer volume, at least one accessed website address, at least one IP address, and at least one port address;

comparing, by the monitoring device, the further data items accruing from the present behavior of at least one of the plurality of users to the baseline transaction profile of the at least one of the plurality of users;

comparing, by the monitoring device, the type of transactions executed by the at least one of the plurality of users to the group baseline transaction profile of one of the groups into which the at least one of the plurality of users is grouped;

based on the comparison, detecting, by the monitoring device, irregularities between the present behavior and the type of transactions executed by the at least one of the plurality of users and at least one of the baseline transaction profiles of the at least one of the plurality of users and the group baseline transaction profile of the one of the groups, the detecting of irregularities including detecting an automated execution of a transaction, and detecting a deviation from the normal operation of each of the plurality of computing devices, the deviation including a deviation in data transfer volume, a continued access to a website address or an IP address not in the baseline transaction profile, or access to a deviation of a port address;

generating, by an alert module of the data processing apparatus, an alert, in real time, based on the detection of the irregularities, the irregularities from the normal operation comprising a deviation in data transfer volume, a continued access to a website address or IP address not in the baseline transaction profile, or a deviation of a port address, the irregularities potentially being indicative of malware; and updating, by the monitoring device, the baseline transaction profile of each of the plurality of users and the group baseline transaction profile of each of the groups to include the further data items accruing from the present behavior of each of the plurality of users.

6. The method of claim 5, wherein the plurality of data items comprise at least one of: security purchase transaction data, security sale transaction data, put options pricing data, global address lookup, network address, routing information, transaction time stamp, transaction date stamp, and device cookies data.

7. The method of claim 5, further including retrieving the responsibility levels of the plurality of users from a plurality of transaction profiles of the plurality of users.

8. The method of claim 5, wherein the historical behavior includes data items selected from at least one of a rate, volume, price, stock ticker, periodic variances in volume rates, and seasonal variances in rates or volumes.

9. The method of claim 5, wherein the irregularities include any of anomalous attempts to access websites which are not normally accessed, an attempt to transfer significant amounts of data to a computer or memory device that is not normally in use, generation of a large number of emails in a particular period of time, or combinations thereof.

10. The method of claim 5, wherein the plurality of data items comprise any of proxy logs and NetFlow records that record a destination of data sent through outgoing ports of a user computer or a transactional server, as well as a source of incoming data received through an incoming port of the user computer or the transactional server.

11. The method of claim 5, wherein the plurality of data items comprise headers in emails or other messages sent throughout a computer network, the email headers comprising information selected from a time, a destination, a source, or a size of an email.

12. The system of claim 1, wherein the plurality of data items comprise at least one of: global address lookup, network address, routing information, time stamp, date stamp, incoming and outgoing ports connected to processes, device addresses, and data size.

13. The method of claim 5, wherein the plurality of data items comprise at least one of: global address lookup, network address, routing information, time stamp, date stamp, incoming and outgoing ports connected to processes, device addresses, and data size.

14. The system of claim 1, wherein updating the baseline transaction profile of each of the plurality of users may comprise a set of newly gathered data items and a set of data items relating to the irregularities.

15. The method of claim 5, wherein updating the baseline transaction profile of each of the plurality of users may comprise a set of newly gathered data items and a set of data items relating to the irregularities.

16. The system of claim 1, wherein the domain name system (DNS) server data log entry comprises time stamps, the time stamps indicating time of attempted access to a plurality of web site addresses and external server addresses.

* * * * *

UNITED STATES PATENT AND TRADEMARK OFFICE
CERTIFICATE OF CORRECTION

| | | |
|---|---|---|
| PATENT NO. | : 11,423,478 B2 | Page 1 of 1 |
| APPLICATION NO. | : 15/406251 | |
| DATED | : August 23, 2022 | |
| INVENTOR(S) | : Stephen Dodson | |

It is certified that error appears in the above-identified patent and that said Letters Patent is hereby corrected as shown below:

On the Title Page

Item (54) and in the Specification, Column 1, Lines 1-2:
The title "Method and Apparatus for Detecting Rogue Trading Activity"
Should read:
"Method and Apparatus for Detecting Malware and Rogue Trading Activity"

Signed and Sealed this
Fourth Day of October, 2022

Katherine Kelly Vidal
*Director of the United States Patent and Trademark Office*